United States Patent [19]

Durand et al.

[11] 4,308,856
[45] Jan. 5, 1982

[54] PROTECTION AGAINST THE FREEZING OF SOLAR COLLECTORS

[75] Inventors: Francois Durand; Lucien Besse, both of Septemes Les Vallons, France

[73] Assignee: S.A. Lipsudest, Septemes Les Vallons, France

[21] Appl. No.: 41,750

[22] Filed: May 23, 1979

[30] Foreign Application Priority Data

May 25, 1978 [FR] France ................. 78 16350

[51] Int. Cl.³ .................. F24J 3/02; E03B 7/10
[52] U.S. Cl. .................. 126/418; 126/446; 138/28
[58] Field of Search ............ 24/217 R, 356 R, 332; 403/387, 399, 366; 126/434, 418, 446; 137/59, 60, 61, 69; 138/27, 28, 32; 165/134; 237/80

[56] References Cited

U.S. PATENT DOCUMENTS

| 227,208 | 5/1880 | Bittenbring | 138/28 |
|---|---|---|---|
| 830,175 | 9/1906 | Robinson | 138/28 |
| 2,202,756 | 5/1940 | Cline | 126/434 |
| 2,594,232 | 4/1952 | Stockstill | 126/446 |
| 2,646,818 | 7/1953 | Bimpson | 248/62 |
| 2,963,753 | 12/1960 | Seaburg | 403/387 |

FOREIGN PATENT DOCUMENTS 3478  8/1979  Int'l Pat. Institute ............ 126/450

*Primary Examiner*—Samuel Scott
*Assistant Examiner*—G. Anderson
*Attorney, Agent, or Firm*—Young & Thompson

[57] ABSTRACT

A solar heat collector has a transparent cover and metal fins beneath the cover. Secured to each fin is a tube through which flows water to be heated, the tube having the general cross-sectional configuration of a figure eight and the tube being welded to the fin at one end of the major axis of the figure eight. Round steel bars are disposed on opposite sides of and extend lengthwise to the tube, in the depressions on the sides of tube caused by the figure eight configuration; and a spring clip presses those bars against the tube. As a result, when water in the tube freezes and the tube expands, the bars and spring clip are pressed apart; but when the ice melts, then the spring clip forces the tube back to its original configuration. The structure also provides protection against surges of water pressure.

1 Claim, 1 Drawing Figure

U.S. Patent Jan. 5, 1982 4,308,856
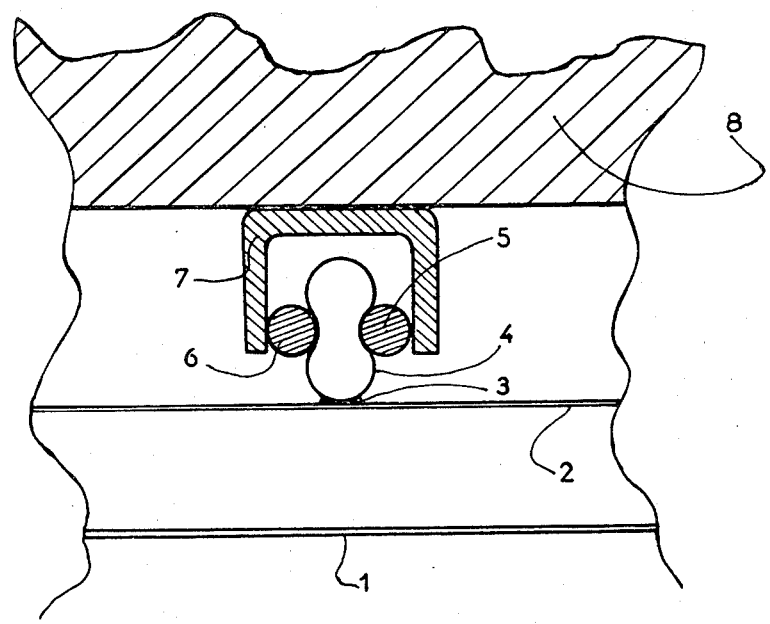

PROTECTION AGAINST THE FREEZING OF SOLAR COLLECTORS

It is a fact that for producing warm water for household purposes with solar flat collectors it is desirable to have the heat collecting pipes of the collectors directly connected with the pipes of the water supply for the house, the house water being itself the solar heat collecting fluid. This avoids the use of a heat exchanger, increases the efficiency and reduces the cost of the installation. In the collectors, the tubes with fins that collect the heat are welded to the upper and lower collector tubes that are located in thermal insulation. The tubes that are welded to the fins and are welded into the upper and lower collector tubes are copper tubes with a wall thickness of about 0.5 mm and have to be round at each end to allow the welding into the upper and lower collector tubes. During normal use in winter in many parts of the world, the upper and lower collector tubes are not subject to damage by freezing as they are located in thermal insulation, but this is not the case for the tubes with fins which are located between the back insulation of the solar collector and the front transparent covering plate which may be glass or plastic.

The present invention avoids damage to the copper tubes with fins when the inside water freezes; for this purpose the tubes, with exception of the parts at each end which are welded into the upper and lower collector tubes and are located in the thermal insulation, have their round profile converted into a figure eight profile, this with any well known mechanical instrument, with a press or between rolls, this mechanical deformation being followed with an annealing heat treatment. One part of the tube profile located at one end of the longest axis is welded to the fin, from the opposite side of the profile a U steel profile with interposition of one round steel bar in each sunken part of the figure eight profile, clips the tube; and the steel U profile is thick enough to work as a spring. This means that each time the water in the tube freezes, the dilatation slightly opens the U steel profile, and when the ice melts, the U steel profile works as a spring and brings back the copper tube to the form it had before the freezing process. Also, in case of very high pressure surge in the water pipes, the U steel profile prevents the copper tube from being rounded out by over pressure.

If the fin which is welded on the copper tube is strong enough the U profile may be replaced by two L profiles fixed to the fin on each side of the copper tube, the spring effect of the U profile being replaced by the spring effect of the fin plus the two L profiles.

The accompanying drawing shows a view perpendicular to the axis of the figure eight tube with fin.

In the drawing, 1 is the transparent cover, 2 is the heat collecting fin welded at 3 to the tube 4 whose profile has the form of a figure eight; 5 and 6 are round steel bars, 7 is a U steel profile, 8 is the thermal insulation of the back of the flat solar collector. It is easy to see that for an about 12% volume increase inside the tube 4 due to water freezing, elastic deformation of the U steel profile will bring back to its initial profile the tube 4 as soon as the ice is melted and that in case of a high pressure surge in the water pipes, tube 4 will also come back to its initial profile when the pressure surge is over.

We claim:

1. A solar heat collector, comprising a transparent cover and a metal fin beneath the cover, a tube secured to the fin in heat exchange relation therewith, the tube having a figure eight cross section and being secured to the fin at one end of the major axis of the figure eight along the length of the tube, a spring clip that presses the midportions of opposite sides of the tube together in a direction perpendicular to said major axis over the length of the tube, and metal bars disposed between the spring clip and the tube in the indentations on opposite sides of the tube that result from the figure eight cross section of the tube, said bars transmitting the compressive effect of the spring clip to the tube, said bars being round in cross-sectional configuration and said spring clip being of U-shaped cross-sectional configuration.

* * * * *